Jan. 14, 1941.    L. HAHN    2,228,628
TREATMENT OF SULPHITE WASTE LIQUOR
Filed Sept. 9, 1938
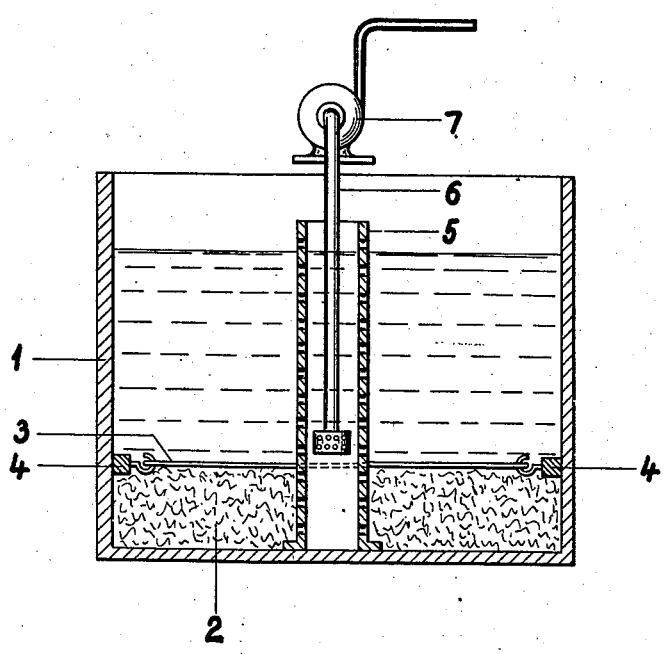
Inventor
Ludwig Hahn
by Michaelis & Michaelis,
attys.

Patented Jan. 14, 1941

2,228,628

UNITED STATES PATENT OFFICE 2,228,628

TREATMENT OF SULPHITE WASTE LIQUOR

Ludwig Hahn, Cesky Krumlov, Czechoslovakia, assignor of one-half to the firm: Böhmisch-Krumauer Maschinenpapier-Fabriken Ignaz Spiro et Söhne, Aktiengesellschaft, Cesky Krumlov, Czechoslovakia Application September 9, 1938, Serial No. 229,060
In Czechoslovakia April 28, 1937

4 Claims. (Cl. 195—32)

My invention relates to the treatment of sulphite waste liquor for the purpose of utilizing valuable constituents contained in such liquor. It has particular reference to the decomposition, by biological action, of certain organic constituents.

It is an object of my invention to provide a novel and advantageous method of fermenting such organic compounds and quite especially the sugar contained in sulphite waste liquor for the production of ethyl alcohol and other valuable products without adding nutrient salts.

Other objects of my invention will appear as the specification proceeds.

It is known that the waste liquor resulting in the boiling of sulphite pulp contains 20–30 kilograms sugar per cubic meter, approximately 70% of which can be converted into ethyl alcohol by fermentation. As a rule the sulphite waste liquid is freed from gases, neutralized with lime and fermented during 48–72 hours at about 30° C. in large fermenting tanks with an addition of yeast and sulphate and phosphate of ammonia as nutrient salts, the ethyl alcohol formed being distilled off, while the residual liquid is withdrawn into a draining ditch.

According to the present invention I am enabled to not only ferment the sugars contained in sulphite waste liquor, but also to decompose part of the other organic constituents under formation of carbon dioxide and water, without adding any nutrient salts or micro-organisms. The yield of ethyl alcohol in this process is nevertheless as high as in the prior art processes.

I have discovered that vegetable matter such as straw, grass, wood wool or wood pulp and the like under certain conditions cause the formation, in sulphite waste liquor, of a fungous culture which decomposes the carbohydrates of the sulphite waste liquor as well as part of its other organic constituents. Quite especially the straw of cereals contains the ferment required for this biological decomposition, which meets the most favorable conditions of life in the sulphite waste liquor without requiring any addition of nutrient salts.

In the drawing affixed to this specification and forming part thereof an apparatus for carrying out the new process is illustrated diagrammatically by way of example.

In practicing my invention I may for instance proceed as follows: the sulphite waste liquor is freed altogether from gases and more particularly $SO_2$ and is thereupon neutralized with lime, quicklime, the sludge resulting in causticization or some other alkaline material, to a pH value of 4 to 8. This is best performed in the usual manner by contacting in a tank the hot sulphite waste liquor or cellulose wash with the corresponding quantity of the alkaline substance and thereupon blowing air through the liquid. After the reaction has come to an end, the neutralizing agent in excess is allowed to settle down and the clear solution is withdrawn into the fermentation tank, which is charged with the vegetable matter containing the ferment.

In order to save the time which is otherwise required for the fermentation of the whole of the waste liquor, I prefer to breed a fermentative culture in the laboratory. For this purpose I pour sulphite waste liquor, which has been freed from gases and neutralized in the manner mentioned above, over the carrier substance for the fungous culture, preferably over straw, and allow the mixture to stand at 30–40° C. until a vivid development of gas occurs. About 20 grams straw are employed per liter of the waste liquor. The culture is preferably bred in a thermostat vessel. As soon as the culture has well developed, large quantities of the carrier for the fungous culture arranged in the fermentation tank can be infected therewith. When after some days the culture in the fermentation tank has reached its highest efficacy, it is able to acclimatize to a wide range of temperatures, viz. within the limits of 0 and 70° C. The culture is further highly resistive to chemical influences and retains its activity at hydrogen ion concentrations within the range of pH=4 and pH=9. A hydrogen ion concentration between pH=5 and 7.5 has been found to be most favorable.

Fermentation may for instance be carried out in the apparatus illustrated in the drawing, where 1 is a fermentation tank made of wood, concrete or some other suitable material. Artificial pools may also serve for this purpose. At the bottom of the fermentation tank is spread out the carrier 2 of the fungous culture, preferably straw, at the rate of 2 to 20 kilograms per cubic meter of the tank content. The carrier is pressed down by the wires 3 in the frame 4. If straw is employed, the wires may be spaced about 30 cms. A sieve cylinder 5 formed with meshes of about 1 cm.², is arranged vertically in the middle of the fermentation tank. Into this cylinder extends the suction pipe 6 of the pump 7 which serves to withdraw the liquid from the fermentation tank without the carrier substance 2 being carried along.

When starting operation in this plant I infect straw or similar vegetable matter arranged in the tank with the culture bred in the laboratory as described above and thereupon fill the tank 1 with neutralized waste liquor freed from gases. No nutrient salts are added. A vigorous fermentation sets in and, on being completed after the lapse of 48 to 72 hours, brings about a decomposition of up to 25% of the organic matter contained in the waste liquor. The temperature of fermentation may vary within the wide limits of 0–70° C., so that the fermentation need not be carried out with low-cooled waste liquor, but may also occur in the open even in the cold season without requiring heating.

After the fermentation has come to an end, the fermented waste liquor or cellulose wash is withdrawn by the pump 7 into a draining ditch or may be treated further for the recovery of spirit according to any known method. A fresh portion of neutral sulphite waste liquor or cellulose wash free from gases is then pumped over the fungous culture left on the straw or other carrier substance in the fermentation tank. This fresh batch starts fermenting within a short time, mostly within an hour. No more fungous cultures need be added nor is any addition of nutrient salts made, which distinguishes the new method advantageously from the known methods of operation. Since the new method does not involve any costs of operation, it allows the biological purification of sulphite waste liquor even in such cases where no products of fermentation may be recovered. Moreover, the waste liquor fermented according to the new method is still more harmless with respect to the draining ditches than the residual liquors obtained in the known processes of fermenting sulphite waste liquor, in consequence of the fact that the liquor is decomposed farther, while no nutrient salts are present.

If the fermentation is not carried out with the intention to recover ethyl alcohol, but in order to relieve the draining ditch by the sulphite waste liquors led into same, fermentation is preferably carried out in pools. It is known that the removal of the carbohydrates in the waste liquor is of great importance with regard to the handling of waste liquors since the carbohydrates cause a rapid growth of algaes and fungi, particularly of sphaerotilus natans and leptomitus lacteus. These fungi develop mainly at the expense of the sugars which flow into the rivers with the waste liquor and cause much trouble, including the floating of fungi, the formation of sludge, fermentation and finally putrefaction, whereby the water is spoilt for practical use as well as for fishing.

The present invention allows of freeing the waste liquors at low cost from the carbohydrates. Since this treatment does not require any addition of valuable nutrient salts, the process can be carried out even in cases where the ethyl alcohol formed cannot be recovered. In respect to the purification of waste liquors it is of importance that the organic matter is decomposed to a farther extent than in the hitherto known processes for the fermentation of sulphite waste liquor.

Various changes may be made in the details disclosed in the foregoing specification without departing from the invention, or sacrificing the advantages thereof.

I claim:

1. The method of treating sulphite waste liquor for the decomposition of its organic constituents by biological action, which comprises causing fermentation of neutralized sulphite waste liquor, freed from gases, in the absence of added nutrient salts and in the presence of vegetable matter carrying fermentative cultures developed on said vegetable matter in the presence of sulphite waste liquor.

2. In the process of claim 1, the step of allowing fermentation to proceed at a temperature ranging between 0 and 70° C.

3. In the process of claim 1, the step of allowing fermentation to proceed at a temperature ranging between 0 and 70° C., withdrawing the fermented liquor and continuously supplying to the vegetable matter carrying the bred culture fresh portions of sulphite waste liquor for fermentation.

4. The method of claim 1, in which the ethyl alcohol formed by the fermentation is recovered from the liquor treated.

LUDWIG HAHN.